Aug. 14, 1945.  C. J. HARASTA  2,382,631
OPTICAL GUN SIGHT
Filed March 18, 1943
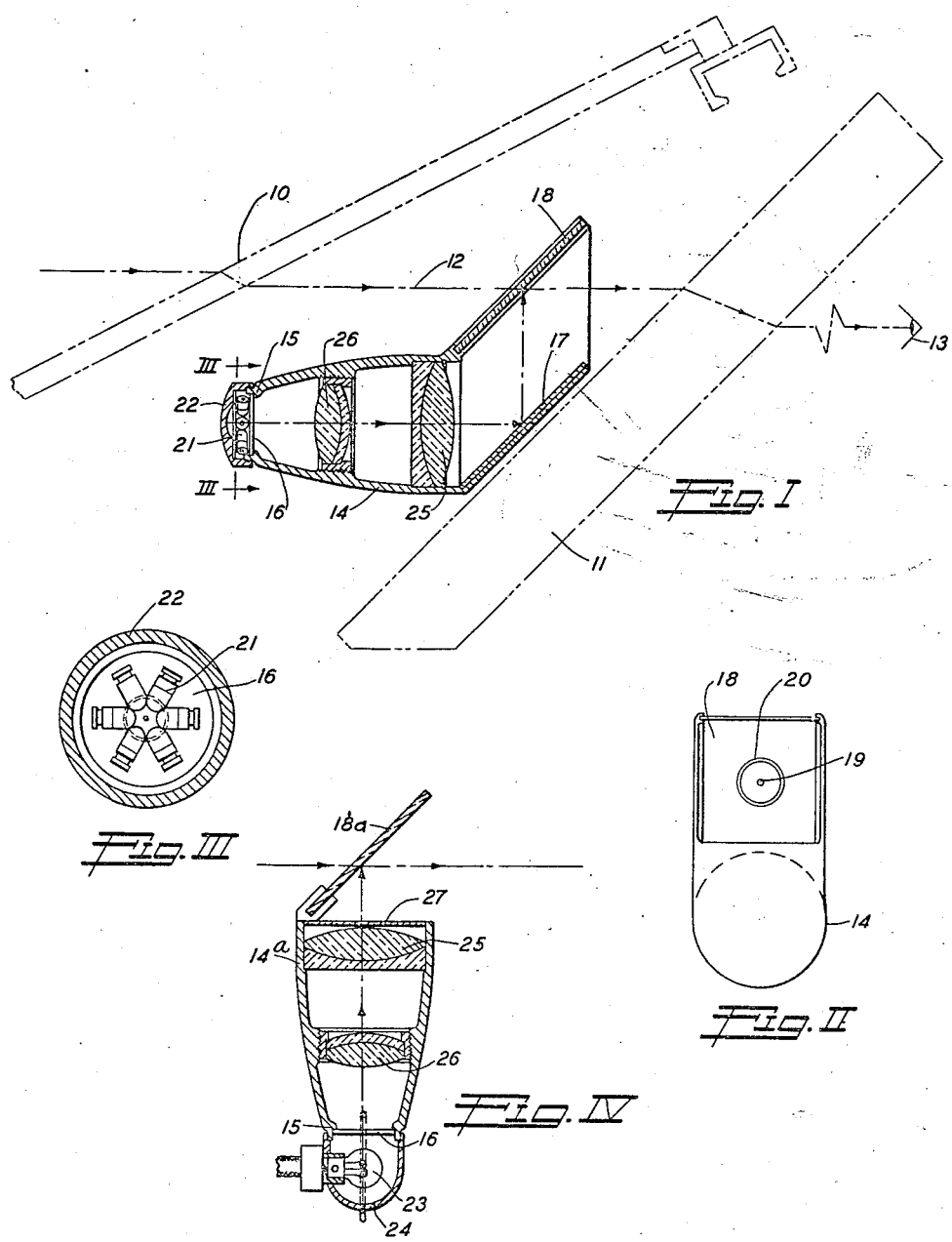
INVENTOR
CLARENCE J. HARASTA
BY George Sullivan
AGENT Patented Aug. 14, 1945

2,382,631

UNITED STATES PATENT OFFICE 2,382,631

OPTICAL GUN SIGHT

Clarence J. Harasta, Los Angeles, Calif., assignor to Lockheed Aircraft Corporation, Burbank, Calif.

Application March 18, 1943, Serial No. 479,674

9 Claims. (Cl. 88—2.3)

This invention relates to an improved optical gunsight adapted to be mounted in the field of vision of an airplane pilot or gunner, to project an illuminated reticule image in alignment with guns operated by such a pilot or gunner and aimed by the operation of the airplane itself, or by the movement of the sight as a unit with the gun.

In a fighting or pursuit airplane the pilot is usually provided with guns which he aims by pointing the airplane itself at the target. Simple optical gunsights, such as are now in use in American fighting planes, utilize a projector to reproduce a lighted reticule pattern on an angularly disposed semi-reflecting piece of plate glass through which the pilot can see the target, with the reticule pattern superimposed thereon, in effect the reticule pattern being reflcted back to the pilot's eye at the same time he looks through the inclined semi-reflecting glass to bring the target into alignment with the reticule pattern. An example of such a gunsight is shown in the Russell et al. Patent No. 1,610,532. Air Corps gunsights constructed in accordance with the patent mentioned are too bulky to fit into enclosed cockpits of modern fighting aircraft when a thick bullet-proof glass shield must be installed in connection with the windshield. Such sights as now constructed are so heavy and bulky as to preclude the use of an adequate thickness of bullet-proof glass in front of the pilot or gunner. As an example of current practice, government furnished sights for the P-38 have a focal length of approximately 7½ inches with a working diameter of 2¼ inches and therefore must be so mounted that the semi-reflector surface is disposed at an angle of approximately 20° to the optical axis, requiring a very long and expensive reflector. By radically changing the design of the sight I have been able to produce an improved sight having the same working area or field of view in a focal length of 2 inches or less, and weighing but a fraction of that of the present design.

It is accordingly an object of this invention to provide an improved and simplified optical gunsight of greatly reduced focal length and proportionately increased compactness accompanied by a corresponding reduction in weight.

It is a further object of this invention to produce an improved and simplified optical gunsight wherein the focal length of the optical system can be greatly reduced, without sacrifice of field of view, thus enabling the light source and reticule to be mounted in alignment with the optical axis of the lens system.

Other and further important objects of this invention will be apparent from the disclosures in the specification and the accompanying drawing.

This invention in its preferred form is illustrated in the drawing and hereinafter more fully described.

On the drawing—

Figure I represents an axial section of a horizontally disposed gunsight embodying the features of this invention, shown as mounted between a windshield and a plate of bullet-proof glass.

Figure II represents the pilot's or gunner's eye view of the sight of Figure I with the windshield and bullet-proof glass panels omitted.

Figure III is a section on the line III—III of Figure I to show a multiple light source for illuminating the reticule.

Figure IV represents an axial section of a vertically disposed gunsight similar in construction to that of Figure I but embodying a single dual filament bulb as a light source.

As shown—

The cockpit arrangement of an airplane, selected to illustrate the use of the sight of this invention, includes a sloping windshield panel 10 and a thick bullet-proof glass panel 11. The latter could possibly be combined with the windshield if the canopy were redesigned, but in existing and continued production airplanes of this type it is desired to include both a bullet-proof panel and an optical gunsight. A sight line is indicated at 12, and the pilot's eye at 13, the eye distance from the sight being approximately 16 inches. In practice the gunsight is adjustably mounted to accommodate about 2½° movement either way from a sight line determined by the bore sight line and/or trajectory of fixed guns (not shown), such adjustment commonly being used to accommodate the sight to the trajectory of the bullets from the gun at an anticipated or most usual target distance, although individual pilots seemingly are most successful if allowed to set their sights to suit personal idiosyncrasies.

In both Figures I and IV a sight body 14 or 14a respectively forms a lens system housing and terminates at its rear or lower end in a mounting shoulder 15 for a patterned reticule 16. The front or top of the body 14 has differing provisions for reflection of the reticule image, Figure I requiring a total mirror 17 to reflect the image to a semi-mirror 18 located in the sight line, while Figure IV needs only the semi-mirror 18a because the optical axis of the sight intersects the sight line. In either case the semi-mirrors are merely selected sheets of glass, the rear surface of which reflects the reticule image into the sight line while the pilot or gunner is looking through the glass reflector at the target.

For reasons to be discussed in more detail in connection with the lens system, I desire to use a colored or light filtering reticule having a dot 19 and circle 20 pattern, as indicated in Figure II. The dot 19 then is the principal aiming point, and the circle 20 acts to help center the target.

The reticule may be illuminated by a plurality of small lamps 21 in a detachable cap 22 as in Figures I and III; or by a single large bulb 23 in a larger reflector housing 24, as in Figure IV. In the latter case it is desirable to use a twin filament bulb with an external change-over switch in the electric circuit, so that if one filament burns out at a critical time, the pilot or gunner can immediately switch over to the other filament, without attempting to replace the bulb itself.

The essential optical problem in the case of the gunsight is to produce parallel light from a point source. The lens system required to project the reticule pattern as parallel rays may comprise a pair of similar spaced lens pairs, each having a positive lens of low dispersion and a negative lens of high dispersion. The combinations form achromatic doublets. In view of the critical supply situation regarding flint glass required for such doublets I alternately propose to use a two component lens system 25 and 26 separated by a distance equal to half the sum of the focal lengths of the components.

Light from the point source of the reticule enters the lens. If all the emergent light rays are parallel the pilot will see the image of the reticule at an infinite distance, in effect as if superimposed on the target, and the position of that image will not shift on the target as he moves his eye over the entire area of the lens.

In principle, parallel light may be obtained by placing the reticule at the principal focus of a perfect lens. Actually no perfect lens exists. All lenses are subject to aberrations. In the case of the gunsight the area of the lens must be kept large in order that the pilot may have some freedom in the position of his eye. At the same time, the distance from the reticule to the lens must be kept small for the sake of compactness. Inasmuch as all aberrations increase as the ratio of lens diameter to focal length increases, the aberrations will be especially severe in the gunsight system.

The five aberrations to which lenses are subject are:

1. Spherical aberration
2. Chromatic aberration
3. Coma
4. Astigmatism
5. Distortion Astigmatism and distortion are present only if the light traverses the lens system at a large angle to the optic axis. The reticule consists of a dot in the center of a circle and inasmuch as the diameter of the circle is less than ten degrees, neither astigmatism nor distortion will cause trouble.

Coma is also an extra-axial aberration due to skew rays through the lens system. It affects rays making a small angle with the optic axis and hence would cause distortion of the image at the circle of the reticule. Inasmuch as the dot of the reticule is on the optic axis, its position would not be affected by coma. Since the dot represents the actual position of the line of fire, while the circle is only an aid in centering the target, it is felt that the presence of a small amount of coma would not be serious.

Chromatic aberration is due to the difference in the indices of refraction of the various colors. It affects rays originating on the axis, and therefore must be eliminated. Its effect would be to cause the dot to appear as a colored line and the circle as a band of circles.

Chromatic aberration can be corrected by use of an achromatic doublet, but the supply of flint glass required for diverging lens thereof is critically limited and it is therefore preferable at present, to use the alternative method described herein. It is minimized by the use of an orange filter over the reticule which absorbs the blue fringe and therefore allows concentration of the chromatic corrections on the red, yellow, and green components of the light source. An achromatic doublet comprises a positive lens of low dispersion with a negative lens of high dispersion. In the case of the gunsight it is possible to use another method as well, namely, that of using a two component lens system separated by a distance equal to half the sum of the focal lengths. This is advantageous in that it leaves the variables of radius and refractive index, free to correct for the final remaining aberration, namely, spherical aberration.

Spherical aberration is due to the fact that the lens surfaces must, for production reasons, be sections of spheres rather than ellipsoids and hyperboloids. Its effect is to bring the rays traversing the lens near the edge, to a focus at a different point than rays traversing the central regions. In the case of the gunsight its effect for a simple lens would be to cause the apparent position of the reticule image to shift radially as the pilot moved his eye radially from the center of the area of vision. It must be minimized to a much higher degree than is necessary in camera lenses in order that the sight be accurate. Spherical aberration is least for lenses of a given power when the deviation of the ray is the same at both lens surfaces. It may be eliminated for ideally thin lenses by combining a strong positive lens shaped to minimize spherical aberration with a weak negative lens of such a shape as to magnify the effect.

Thick lenses can not be completely corrected for spherical aberration because the distance of the ray from the axis is not the same in the two lenses. However, correction can be achieved to a high degree, especially since all variables may now be used to correct for this one aberration.

While the larger lens component 25 may be reversed to present the plane surface of the diverging component on top, the softness of the lens glass may make it desirable to add a thin cover glass 27, as shown in Figure IV in order to protect the exposed lens surface from dust and mechanical abrasion, as would be caused by wiping with a dirty cloth.

It will thus be seen that a lens system of the type shown is capable of minimizing spherical aberration in a high degree. It has an f number or numerical aperture of approximately .7 or .8. Further, such a large aperture gives a working circle area of approximately 2¼ inches, in a focal length of less than 2 inches, so that the gunner can shift his eye position approximately an inch in any direction from the optical center line without losing the reticule image, which maintains its position on the target within an error of 1 or 2 mils.

Having thus described my invention and the present preferred embodiments thereof, I desire to emphasize the fact that many modifications may be resorted to in a manner limited only by a just interpretation of the following claims.

I claim as my invention:

1. An optical gunsight arranged to project a virtual image in the form of a luminous sighting pattern in a desired direction for visual superimposition on a remote target, comprising a lens casing, a sheet of glass supported at an angle to the axis of the casing and so positioned as to intercept the desired line of sight at a point coincident with the axis of the casing, an achromatic double lens system in said casing, a reticle positioned at the principal focus of said lens system, and a filtered light course, adapted to illuminate said reticle with substantially monochromatic light whereby the chromatic aberration corrections of the lens system can be matched to the substantially monochromatic light from the filtered light source.

2. An optical gunsight arranged to project a virtual image in the form of a luminous sighting pattern in a desired direction for visual superimposition on a remote target, comprising a lens casing, a sheet of glass supported at an angle to the axis of the casing and so positioned as to intercept the desired line of sight at a point coincident with the axis of the casing, an achromatic double lens system in said casing having spaced components, a reticle positioned at and aligned with the principal focus of said lens system, and a filtered light source aligned with and adapted to illuminate said reticle with substantially monochromatic light whereby the chromatic aberration corrections of the lens system can be matched to the substantially monochromatic light from the filtered light source.

3. An optical gunsight arranged to project a virtual image in the form of a luminous sighting pattern in a desired direction for visual superimposition on a remote target, comprising a lens casing, a sheet of glass supported at an angle to the axis of the casing and so positioned as to intercept the desired line of sight at a point coincident with the axis of the casing, an achromatic double lens system in said casing, a reticle having a non-linear sight pattern positioned at the principal focus of said lens system, and a filtered light source adapted to illuminate said reticle with substantially monochromatic light whereby the chromatic aberration corrections of the lens system can be matched to the substantially monochromatic light from the filtered light source.

4. An optical gunsight arranged to project a virtual image in the form of a luminous sighting pattern in a desired direction for visual superimposition on a remote target, comprising a lens casing, a sheet of glass supported at an angle to the axis of the casing and so positioned as to intercept the desired line of sight at a point coincident with the axis of the casing, an achromatic double lens system in said casing having spaced components, a reticle having a non-linear sight pattern positioned at and aligned with the principal focus of said lens system, and a filtered light source aligned with and adapted to illuminate said reticle with substantially monochromatic light whereby the chromatic aberration corrections of the lens system can be matched to the substantially monochromatic light from the filtered light source.

5. An optical gunsight comprising a casing, reflecting means carried thereby adapted to align and superimpose a reticle image onto the desired line of sight, a double lens system adapted to project a reticle pattern onto said reflecting means to be reflected thereby in the line of sight, said lens system comprising pairs of strong positive and weak negative lenses spaced apart by half the sum of their focal lengths and together defining a lens system having an f aperture of less than 0.8 and a focal length of less than 2 inches, said lens system having its chromatic corrections primarily directed to red, yellow, and green aberrations, a reticle at the principal focus of said lens system and having an orange filter whereby to suppress residual blue aberrations in the lens system, and a source of light for illuminating said reticle.

6. An optical gunsight comprising a casing, reflecting means carried thereby adapted to align and superimpose a reticle image onto the desired line of sight, a double lens system adapted to project a reticle pattern onto said reflecting means to be reflected thereby in the line of sight, said lens system comprising pairs of strong positive and weak negative lenses spaced apart by half the sum of their focal lengths and together defining a lens system having its chromatic corrections primarily directed to red, yellow, and green aberrations, a reticle at the principal focus of said lens system and having an orange filter whereby to suppress residual blue aberrations in the lens system, and a source of light for illuminating said reticle.

7. An optical gunsight comprising a casing, reflecting means carried thereby adapted to project a virtual image in a desired direction for visual superimposition on a remote target, a double lens system adapted to project a reticle pattern onto said reflecting means to be reflected thereby in the line of sight, said lens system comprising pairs of strong positive and weak negative lenses spaced apart by half the sum of their focal lengths and together defining a lens system having its chromatic corrections primarily directed to certain color aberrations, and a reticle and light source combination supplying substantially monochromatic light of said color whereby to suppress residual chromatic aberrations of the opposite color.

8. A gunsight of the type described having a compound lens system axially disposed in a casing in parallel with the desired line of sight, means arranged to project the virtual image of a sight pattern on to a distant target in offset and parallel relationship to the casing, said means including a reflector at one end of said casing disposed at an angle to the axis of said casing and a semi-mirror at said one end of said casing disposed at an angle to the axis of said casing and lying in a plane substantially parallel with the plane of said reflector, a reticle having a sight pattern therein disposed in said casing at the principal focus of the lens system, and a plurality of light sources radially disposed relative to the optical axis and adapted to simultaneously illuminate the reticle sight pattern.

9. An optical gunsight arranged to project a virtual image in the form of a luminous sighting pattern in a desired direction for visual superimposition on a remote target, comprising lens casing means, a sheet of glass at one end of said casing means supported at an angle to the axis of the casing means and so positioned as to intercept the desired line of sight at a point coincident with the axis of said casing means, a lens system in said casing means including an achromatic doublet mounted interiorly of the end of said casing means nearest said sheet of glass and lens means in said casing means disposed inwardly of said achromatic doublet, a reticule in said casing means positioned at the principal focus of said lens system, and a filtered light source at the opposite end of said casing means arranged to illuminate said reticule with substantially monochromatic light, whereby the chromatic aberration corrections of the lens system is matched with the light from said light source.

CLARENCE J. HARASTA.